United States Patent
Medina et al.

(10) Patent No.: US 6,829,245 B1
(45) Date of Patent: Dec. 7, 2004

(54) HEAD OF LINE BLOCKING

(75) Inventors: Eitan Medina, Tel Aviv (IL); David Shemla, Kfar Havradim (IL); Yosef Solt, Haifa (IL)

(73) Assignee: Marvell Semiconductor Israel Ltd., Yokneam (IL)

(*) Notice: Subject to any disclaimer, the term of this patent is extended or adjusted under 35 U.S.C. 154(b) by 0 days.

(21) Appl. No.: 09/348,351

(22) Filed: Jul. 8, 1999

(30) Foreign Application Priority Data

Jul. 8, 1998 (IL) .............................................. 125271

(51) Int. Cl.[7] .............................................. H04L 12/56
(52) U.S. Cl. ...................................... 370/413; 370/428
(58) Field of Search ................................. 370/389, 401, 370/229, 230, 231, 232, 235, 236, 252, 254, 411, 412, 413–419, 420, 428, 423, 429, 392, 390; 365/221, 189.05

(56) References Cited

U.S. PATENT DOCUMENTS

| | | | | |
|---|---|---|---|---|
| 5,448,559 A | * | 9/1995 | Hayter et al. ................ 370/398 |
| 5,455,820 A | * | 10/1995 | Yamada ................ 370/395.71 |
| 5,841,722 A | * | 11/1998 | Willenz ...................... 365/221 |
| 6,144,640 A | | 11/2000 | Simpson et al. |
| 6,185,214 B1 | * | 2/2001 | Schwartz et al. ........... 370/401 |

FOREIGN PATENT DOCUMENTS

GB      WO 9809471      3/1998

* cited by examiner

*Primary Examiner*—Dang Ton

(57) ABSTRACT

A network switch which includes a plurality of output ports, at least one input port and a queuing manager. Each output port has a control unit associated therewith. The input port receives incoming data destined for various ones of the output ports. The queuing manager directs the incoming data to their destination output ports. Each control unit includes an output queue, a fullness/emptiness sensor and a head of line (HOL) mask. The output queue stores the incoming data destined for its associated output port. The sensor senses when the output queue reaches a fullness or an emptiness state. The HOL mask is connected to the output of the sensor and blocks inflow of the incoming data to the output queue when the sensor senses the fullness state and for enabling inflow when the sensor senses the emptiness state.

1 Claim, 1 Drawing Sheet

HEAD OF LINE BLOCKING

FIELD OF THE INVENTION

The present invention relates to network switching communication protocols generally and to prevention of head of line blocking in particular.

BACKGROUND OF THE INVENTION

A network switch creates a network among a plurality of end nodes, such as workstations, and other network switches connected thereto. Each end node is connected to one port of the network. The ports also serve to connect network switches together.

Each end node sends packets of data to the network switch which the switch then routes either to another of the end nodes connected thereto or to a network switch to which the destination end node is connected. In the latter case, the receiving network switch routes the packet to the destination end node.

Each network switch has to temporarily store the packets of data which it receives from the units (end node or network switch) connected to it while the switch determines how, when and through which port to retransmit the packets. Each packet can be transmitted to only one destination address (a "unicast" packet) or to more than one unit (a "multicast" or "broadcast" packet). For multicast and broadcast packets, the switch typically stores the packet only once and transmits multiple copies of the packet to some (multicast) or all (broadcast) of its ports. Once the packet has been transmitted to all of its destinations, it can be removed from the memory or written over.

Reference is now made to FIG. 1 which schematically illustrates a portion of the data packet transfer process that takes place within the operations of a network switch 10. Switch 10 comprises a central queuing manager 12, an output buffer 14, and a multiplicity of output ports 16. Switch 10 receives incoming data 18 which it stores until transmission as queued data 24 in output buffer 14. At the appropriate time, which is generally when the relevant output port 16 in available, switch 10 transfers the queued data 24 out of the relevant output port 16 as outgoing data 26.

Output buffer 14 is either a pooled buffer which services the entire switch 10 or a plurality of dedicated queues within buffer 14, one queue per output port 16. The exemplary switch 10 shown in FIG. 1 comprises a pooled output buffer 14 and two output ports 16B and 16C.

Incoming data 18 comprises data packets 30, 32, 34 arid 36, which are designated for various destination ports 16. Data 18 is received by manager 12, which identifies the appropriate destination port 16 of the packets 30, 32, 34, and 36 respectively, and dispatches them to the output buffer 14. As an example unicast data packets 32 and 36 are designated for port 16C, unicast data packet 30 is designated for port 16B and multicast packet 34 is designated for both ports 16B and 16C. Output buffer 14 stores the queued data 24 until the relevant port 16 is available, at which point, the outgoing data 26 is transferred to the relevant port 16.

Occasionally, one of the output ports 16 transfers at a faster pace than the other ports or, alternatively, receives more data then the other ports. For whatever reason, a condition may arise where the data 24 for one of the output ports 16 backs up in the output buffer 14 creating a condition where output buffer 14 is unable to receive more data. Manager 12 is aware of the backup in the output buffer 14, typically through a fullness sensor (not shown) measuring the fullness of output buffer 14, and, accordingly, stops receiving incoming data 18 to switch 10.

All incoming data 18 not received by switch 10 is discarded, regardless of its destination output port 16. Not only is the incoming data 18 destined for the full output port discarded but the incoming data 18 destined for the available ports are also discarded. This problem is known as "Head of Line Blocking".

Although switch 10 no longer receives incoming data 18, it continues to send outgoing data 26, and thus, clears out the output buffer 14. Once enough outgoing data 26 has been sent, output buffer 14 empties out and is again able to receive more data 24. Manager 12 reopens inflow of data 18 to switch 10.

For example, if port 16B is backed up, then the output buffer 14 will become full with queued data 24B, while output port 16C will still available to transmit. Manager 12 halts the incoming flow of data 18. All data 18 incoming into switch 12 is halted and discarded, including unicast data packets 32 and 36 and multicast data packet 34 which are designated for the available port 16C.

SUMMARY OF THE PRESENT INVENTION

It is an object of the present invention to prevent Head of Line Blocking as much as possible.

There is therefore provided, in accordance with a preferred embodiment of the present invention, a network switch which includes a plurality of output ports, at least one input port and a queuing manager. Each output port has a control unit associated therewith. The input port receives incoming data destined for various ones of the output ports. The queuing manager directs the incoming data to their destination output ports. Each control unit includes an output queue, a fullness/emptiness sensor and a head of line (HOL) mask. The output queue stores the incoming data destined for its associated output port. The sensor senses when the output queue reaches a fullness or an emptiness state. The HOL mask is connected to the output of the sensor and blocks inflow of the incoming data to the output queue when the sensor senses the fullness state and for enabling inflow when the sensor senses the emptiness state.

There is also provided. In accordance with a preferred embodiment of the present invention, a control unit for an output port of a network switch as described hereinabove.

Finally, there is provided, a method of controlling flow within a network switch, the method comprising the steps of sensing when an output queue of the network switch reaches a fullness or an emptiness state, blocking queueing of incoming data to the output queue when the fullness state is sensed, discarding of unicast packets destined to the full output port queue, avoiding queuing of multicast packets to said output port queue and enabling queueing when the emptiness state is sensed.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Figure 1:
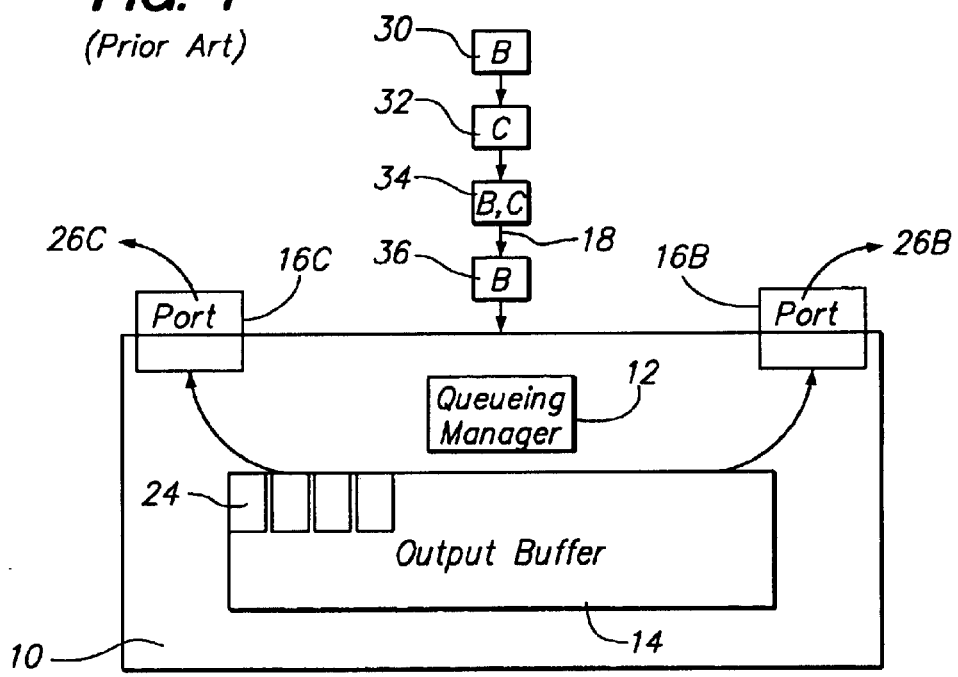
FIG. 1 is a schematic illustration of a prior art network switching protocol.
Figure 2:
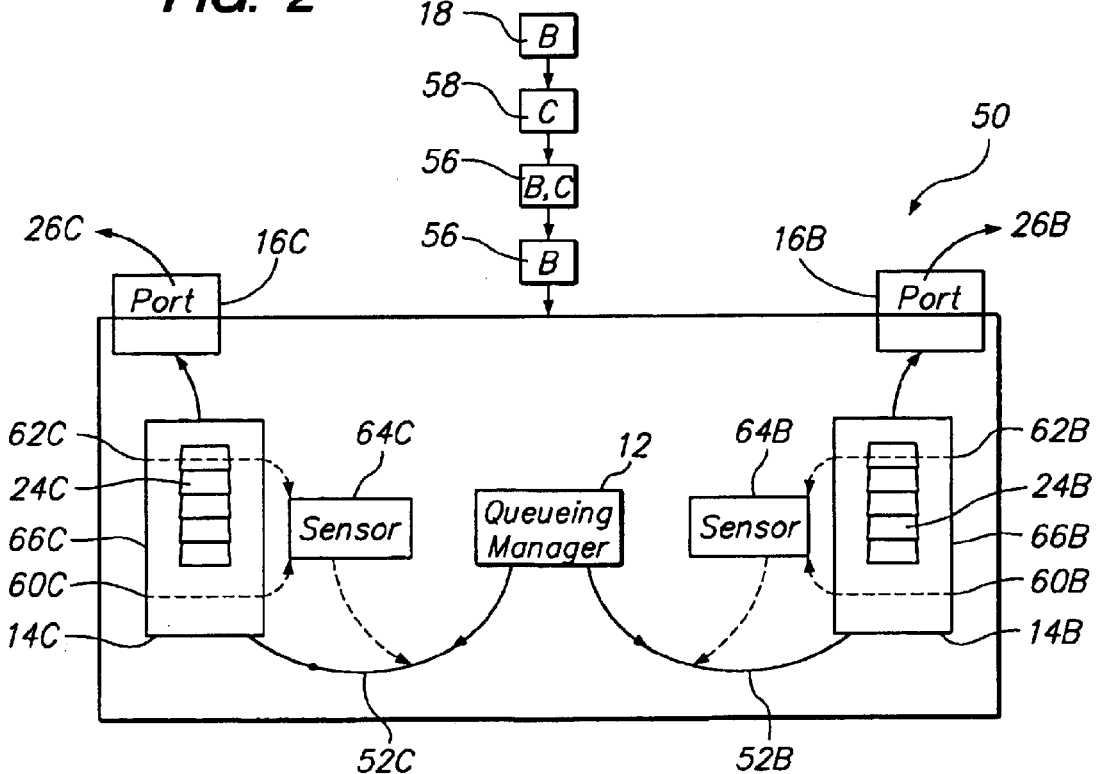
FIG. 2 is a schematic illustration of a network switching protocol constructed and operative in accordance with a preferred embodiment of the present invention.

Reference is now made to FIG. 2 which illustrates, in general terms, a portion of the data packet transfer process that takes place within the operations of a network switch 50, constructed and operative in accordance with a preferred embodiment of the present invention. Switch 50 comprises many of the elements described in the prior art FIG. 1. Elements of FIG. 2 which are similar to those of FIG. 1 have the same reference numerals.

In addition to the prior art elements, switch 50 comprises a plurality of: output queues 66, head of line (HOL) masks 52, fullness watermarks 60, emptiness watermarks 62 and sensors 64.

The output queues 66 function similar to output buffer 14 in that the output queue 66s temporarily store data 24 waiting for transmission to output ports 16. However, in contrast to output buffer 14, output queues 66 are dedicated to their associated output ports 16, for example, output queue 66B is dedicated to output port 16B, and so.

HOL masks 52 control data flow to their output queues 14. FIG. 2 shows HOL masks 52B and 52C as logical switches and operative for output queues 14B and 14C, respectively. Each sensor 64 is dedicated to an associated output queue 66 and relays to manager 12 the fullness or emptiness state of that associated queue 14. Each sensor 64 is a counter which has two thresholds, one associated with its fullness watermark 60 and one associated with its emptiness watermark 62.

Switch 50 receives, distributes, queues and sends data in a manner similar to that described for switch 10. Additionally similar to switch 10, from time to time one of the output ports 16 is busier than the other output ports 16.

The data 24 in one or more output queue 66 backs up and reaches the fullness threshold 60 of that queue 66. Hence queue 66 is almost full and temporarily can not receive any more data 24.

The associated sensor 64 notifies the state of fullness to its associated HOL mask 62, which stops inflow of data to the almost full output queue 66. As an example, when the data 24 in output queue 66B reaches almost fullness, it crosses the fullness threshold 60B. Sensor 64B notifies such to HOL mask 52B which stops data flow to output queue 66B.

Unlike in the prior art which halted all inflow of data 18 to switch 10, switch 50 continues to transfer incoming data 18 to the output queues 66 which are not affected by a backup. Hence, the data going to output queue 66C will be received and its associated output port 16C will continue to operate unhindered. However, incoming data 18 designated for port 16B is discarded.

As a further example, data 18 comprises data packets 54, 56, and 58. Packets 54 and 58 are unicast packets destined for ports 16B and 16C, respectively. Packet 58 is a multicast packet destined for both ports 16B and 16C. All packets 54, 56 and 58 are received by switch 50. Queuing manager 12 identifies the packets and distributes them to the appropriate output queues 66; unicast packet 54 to output queue 66B, multicast packet 56 to output queues 66B and 66C, and unicast packet 58 to output queue 66C. Multicast packet 56 and unicast packet 58 designated for output queue 66C are properly queued for delivery. However, since output queue 66B is full, HOL mask 52B does not queue unicast packet 54 and multicast packet 56 designated for port 16B, and thus, packet 54 is discarded, and packet 56 is queued only to output queue 66C.

Port 16B continues transmitting data 26B, until eventually the data 24B in output queue 66B reaches the emptiness watermark 62 signaling that output queue 68B is almost empty. This information is relayed by sensor 64B to HOL mask 52B which, in turn, reopens inflow to its associated output queue 66B, and data will again be queued to output queue 66B. In this manner, packets destined for output queues 66 which are not full are not affected by HOL blocking from other backed up output queues 66.

It will be appreciated by persons skilled in the art that the present invention is not limited by what has been particularly shown and described herein above. Rather the scope of the invention is defined by the claims that follow:

What is claimed is:

1. A network switch comprising:

a plurality of output ports each having a control unit associated therewith;

at least one input port for receiving incoming data destined for various ones of said output ports; and a queuing manager for directing said incoming data to their destination output ports;

wherein each control unit comprises:

an output queue for storing said incoming data destined for its associated output port;

a fullness/emptiness sensor for sensing when said output queue reaches a fullness or an emptiness state; and a head of line (HOL) mask, connected to the output of said sensor, for preventing queuing of said incoming data to said output queue when said sensor senses said fullness state and for enabling queuing when said sensor senses said emptiness state.

* * * * *